Patented Oct. 16, 1928.

1,687,703

UNITED STATES PATENT OFFICE.

ARTHUR W. ALLEN, OF BERKELEY, CALIFORNIA.

PROCESS FOR THE PRODUCTION OF CLEAR BRINE OR OTHER LIQUORS.

No Drawing. Original application filed November 24, 1925, Serial No. 71,236. Divided and this application filed September 2, 1927. Serial No. 217,309.

This case is a division of Case No. 71,236, filed November 24, 1925, and the purpose of the invention is to insure by simple and inexpensive means the production of a clear liquor from a contaminated brine or other solution. For this purpose, as a filter aid, I use a sufficiency of small water-soluble crystals, preferably of some low-valued chemical compound. These may be added to the solution to be clarified; but, as is often the case, the compound of which such crystals may be composed is a constituent of the liquor to be clarified, and of secondary economic importance. In such event the crystals may be deposited, with or without the dissolving of more of such compound in the solution, (1) by the evaporation of some of the contained water; (2) by cooling it; (3) by chemical action or exchange; (4) by inoculation following supersaturation, or by other means.

As a simple application of this invention: Certain natural brines of actual or potential economic importance contain sodium chloride and potassium chloride, among other constituents. Such liquor, which is usually contaminated with suspended matter, I treat, with or without previous concentration by solar methods, in an evaporator, to insure further concentration to a point providing for the formation of a sufficiency of small crystals of sodium chloride, which thereafter serve as a filter aid in the clarification of the solution, with or without the addition of a coagulant, prior to the recovery of the potash or other products.

A second example to illustrate the application of the invention will be described: In what is known as the Shanks process, the liquors resulting from the heating and consequent circulation of, and evaporation of water from, a solvent solution in contact with a nitrate ore containing sodium chloride, known as caliche, are usually contaminated with suspended matter. In the customary method of procedure, these liquors flow to settlers, where some coagulant may be added. After settlement of the solid matter, the supernatant solution is removed and delivered to crystallizers, for the recovery of the nitrate. The sludge in the settler is impoverished of its associated solution, high in nitrate, with great difficulty, because of low perviousness. The use of an ordinary filter aid, such as prepared diatomite is considered economically impracticable. Considerable wastage of nitrate occurs, as well as of the nitrate associated with the sludge that is deposited below the punched-plate false bottom in the lixiviation vat.

In an improved and efficient alternative I take the liquor as delivered from the lixiviation vat, together with the associated suspended matter, and/or the sludge from the settling vat or released elsewhere, add additional liquor high in sodium chloride if necessary, and send the mixture to an evaporator in which active agitation is maintained. For this purpose, as well as for the concentration of the aforementioned sodium chloride-potassium chloride liquor, I prefer a type of apparatus in which accretion is avoided by pressure circulation of the fluid through heater tubes in a separate vessel, followed by expansion in and rapid flow through an evaporation chamber. During such evaporation of such liquor resulting from the lixiviation of a caliche of the type described, some of the contained sodium chloride is thrown down. Because of adequate movement of the fluid in the evaporator, this appears in the form of small crystals. After sufficient evaporation, I filter the mixture of solution, sodium chloride crystals and suspended matter, with or without previous inspissation, the crystals acting as a filter aid and thereby permitting the removal of the associated solution. I then wash the filter cake, however formed, with a sodium chloride brine, for the displacement of the residual nitrate liquor.

An additional avantage of my method in this particular application is seen in the ability to minimize evaporation during the lixiviation phase of treatment by the Shanks process, carried out under the inefficient conditions obtaining in an open vat fitted with steam coils, on which there occurs an unavoidable accretion of deposited matter; and to conduct this operation of evaporation, in major part at least, in an apparatus especially designed to function at high heat efficiency, low heat loss, and with negligible accretion on the heating surfaces.

An addition example of the application of the invention refers to the treatment of borra or high-nitrate slime that exists in large quantities as a reject or as a residue product of earlier and less efficient methods of beneficiating caliche. This material is in dry or semi-dry form. For the recovery of the associated nitrate, I make a fluid pulp of this material, and a solution of sodium chloride or a mother liquor high in sodium chloride, providing if necessary an excess of sodium chloride, the operation being performed, preferably as a phase of a continuous process, in any suitable mixing vessel provided with the mechanical means for the efficient separation of the particles composing the mass. This apparatus, if considered advisable, is equipped with steam coils, or is steam jacketed, to raise the temperature of the mass. For this operation I prefer a propeller type of mixer, consisting essentially of a truncated inverted cone with bypass ports near the top and mechanically actuated propeller at the bottom, contained in a suitable vessel fitted with an overflow chute or pipe for discharge, the heating surfaces, if provided, being placed so that full advantage is taken of the movement and scouring action of the circulating pulp.

The pulp from this apparatus is then delivered to an evaporator, preferably of the type previously mentioned. The absorption or further absorption of heat by the solution causes nitrate associated with the slime to dissolve, and at the same time some sodium chloride is freed and appears as small crystals. After evaporation has been carried to a point indicating a desirable concentration, whereby additional crystals of sodium chloride are formed, the mixture is then removed and filtered, and the resultant solution is sent to the crystallizers. The filter cake is then washed with brine for the removal of associated nitrate, the resulting liquor being returned to the pulping plant for the mixing of more raw material, or otherwise utilized.

The foregoing description refers only to the use of sodium chloride as a mechanical filter aid; and for the sake of simplicity no mention has been made of the other compounds found in such liquors as those described. The invention, however, is also applicable in connection with the utilization of any suitable water soluble chemical compound that is insoluble in the solution at certain conditions of temperature and concentration, or which exists in the solution in a saturated form. It may be added to the raw material or to the solution, or released from the solution under conditions involving heating, evaporation of contained water, cooling or chemical action or exchange, or by inoculation following supersaturation. Other means may be devised for the use of the basic idea, which may be adapted for many purposes other than those used to illustrate its application, and I claim protection for all variations within the scope of the invention.

I claim, therefore:

1. A process for the clarification of a turbid liquor, comprising the addition of a sufficiency of small crystals of a watersoluble chemical compound that is insoluble in the liquor under the prevailing temperature-concentration conditions, and the filtration of the resultant pulp, such added crystals acting as a mechanical filter aid.

2. A process for the clarification of a turbid liquor, comprising the evaporation of water from the liquor, whereby small crystals of a water-soluble chemical compound are formed to serve as a mechanical filter aid, the resultant mixture of crystals and solution and suspended matter subjected to filtration.

3. A process for the clarification of a turbid liquor, comprising the cooling of the liquor, whereby small crystals of a water-soluble chemical compound are formed to serve as a mechanical filter aid, the resultant mixture of crystals, solution and suspended matter being subjected to filtration.

4. A process for the clarification of a turbid liquor comprising the treatment by chemical action of the liquor, whereby small crystals of a water-soluble chemical compound are formed to act as a mechanical filter aid, the resultant mixture of crystals and solution and suspended matter being subjected to filtration.

5. A process for the clarification of a turbid liquor, comprising the inoculation of the liquor, whereby small crystals of a water-soluble chemical compound are formed to act as a mechanical filter aid, the resultant mixture of crystals and solution and suspended matter being subjected to filtration.

ARTHUR W. ALLEN.